Nov. 14, 1972   J. ROSAN, SR   3,702,707
FITTINGS FOR HIGH PRESSURE FLUID LINES
Filed June 23, 1971
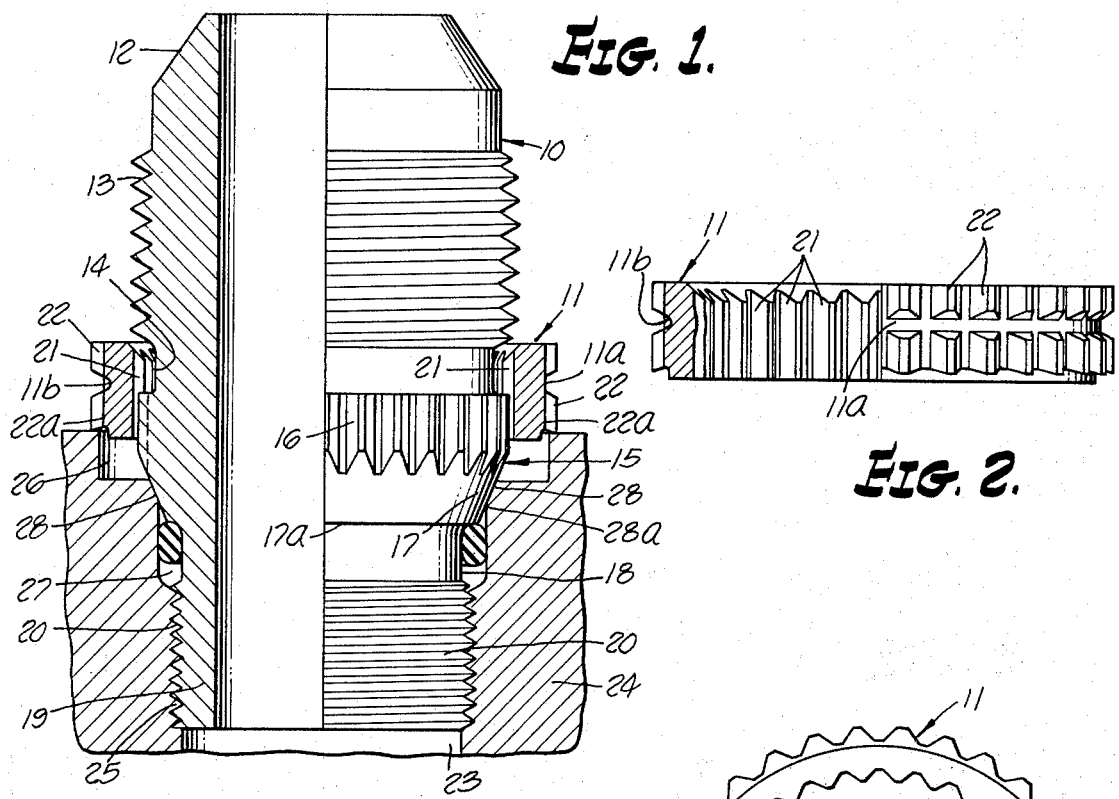
FIG. 1.
FIG. 2.
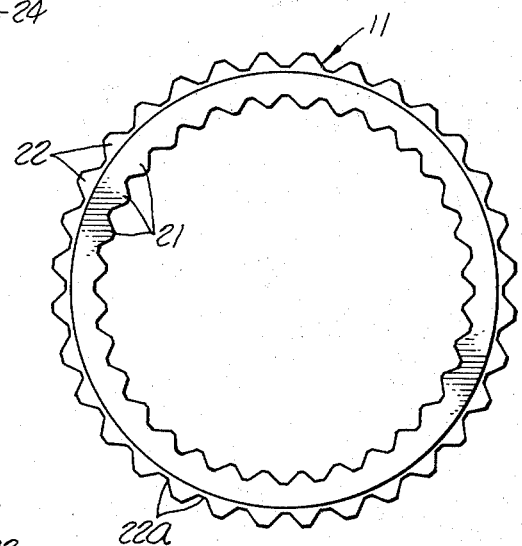
FIG. 3.
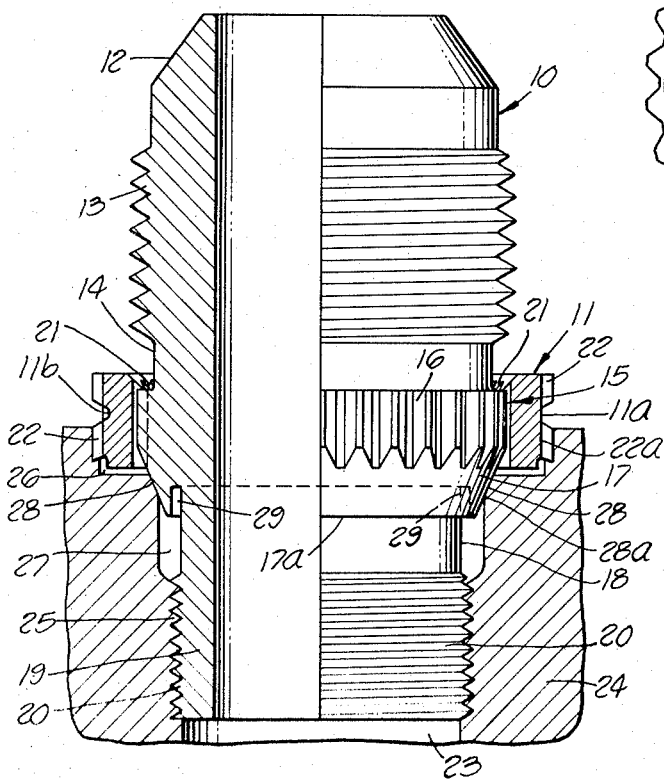
FIG. 4.
INVENTOR
JOSÉ ROSÁN, SR.
BY
Roman A. Difreo
ATTORNEY ns
3,702,707
FITTINGS FOR HIGH PRESSURE FLUID LINES
Jose Rosan, Sr., Rancho San Juan,
San Juan Capistrano, Calif. 92675
Filed June 23, 1971, Ser. No. 155,854
Int. Cl. F16l 55/00
U.S. Cl. 285—23                                6 Claims

ABSTRACT OF THE DISCLOSURE

This invention provides improvements in a fluid fitting which is locked against loosening due to vibration by means of a coacting serrated locking ring which is temporarily rigidly secured to the body of the fitting so as to provide an integral unit. The fluid fitting of the invention provides an improved positive seal whereby the beveled portion of the fitting has a taper thereto which allows said tapered portion to extend into and beyond the beveled surface of the cooperating workpiece bore.

---

This invention relates to fluid fittings, and particularly to an improvement in fittings for high pressure fluid systems.

In the hydraulic systems field, it is necessary to utilize a plurality of fittings which may be secured to various types of equipment and which may require repeated assembly during the process of maintaining the equipment with which they are associated.

Although this problem was satisfactorily solved by the invention disclosed in U.S. Letters Pat. No. 3,395,934, it was found that additional immunity from vibrational failure was achieved by the instant invention wherein the tapered portion of the fitting is provided by a lesser taper angle and a longer extending tapered portion so that the forward end of the tapered portion axially protrudes into and below the cooperating beveled face of the workpiece bore. The instant structure precludes scoring of the beveled face of the workpiece bore by the forward edge of the tapered portion of the fitting and the subsequent susceptibility of the installed fastener to loosen from extraneous vibratory forces.

One of the problems in existing fluid fittings for high pressure service such as in aircraft landing gear or aircraft engines, has been a tendency to become loosened due to vibration. Such loosening may cause a leakage at a joint, and the failure of the fluid system at critical moments of operation. The present invention therefore provides an improved fluid fitting which cannot loosen accidentally or through vibration, and which will insure a positive seal of the fluid system at any pressure which may be encountered.

The objects of this invention are to provide an improvement in fluid fittings to which high pressure fluid lines may be attached.

A further object is to provide a fluid fitting having an improved metal seal to retain high fluid pressures.

A still further object is to provide improved fluid fittings which may utilize conventional O-rings to assist in retaining fluid pressure.

Yet another object is to provide a fluid fitting having less size and weight than comparable fittings without a sacrifice of strength or performance.

Other objects and advantages of the invention will be readily apparent from the following description taken in conjunction with the accompanying drawings in which:

FIG. 1 is an elevational, partly sectional view of the body of the fluid fitting embodying the principles of the invention, threaded into a cooperating workpiece bore and illustrating the lock ring in a preinstalled position.

FIG. 2 is a bottom plan view of the lock ring used in conjunction with the fitting of FIG. 1.

FIG. 3 is an elevational, partly sectioned view of the ring shown in FIG. 2.

FIG. 4 is a view of another embodiment of the invention similar to FIG. 1, but without an O-ring seal and showing the lock ring axially displaced into its locked position in the workpiece.

The invention includes two basic elements, a hollow cylindrical body generally indicated by reference numeral 10 in FIG. 1, and a cooperating lock ring 11 in FIGS. 2 and 3. The body 10 has a tapered upper portion 12 and an externally threaded portion 13 to provide means for tightening a conventional line coupling, not shown, against body 10. Below the threaded portion 13 is a reduced portion 14 and an annular flange 15, having a plurality of uniformly spaced longitudinal serrations 16 disposed about its periphery.

The forward end of flange 15 is gradually reduced to provide a tapered sealing face 17 for a purpose which will hereinafter be described in greater detail. Below the tapered sealing face 17 of flange 15 the diameter of the body is further decreased to provide a reduced portion 18 so that an annular shoulder 17a is defined. The lower portion 19 of the body 10 is also provided with a plurality of external threads 20 to which a suitable screw type fitting may be secured, or which may be threaded into an accommodating workpiece bore (as shown).

Lock ring 11, as illustrated in FIGS. 2 and 3, is provided with internal and external serrations 21 and 22, respectively. When lock ring 11 is assembled with body 10, internal serrations 21 are at least initially in slidable engagement with flange serrations 16. An annular external groove 15a is superimposed about the periphery of external serrations 22 carried by flange 15. It should be noted that the radial depth of groove 15a does not extend inwardly beyond the roots 22a of external serrations 22. When lock ring 11 is axially fully displaced with respect to body 10 of the fastener, groove 11a is then situated approximately adjacent the periphery of the workpiece bore 23. Thus, when it is desired to remove the lock ring 11 from its fully installed position, and concomitantly the fastener, an appropriate tool (not shown) is inserted in groove 11a and the locking ring is dislodged from intimate contact with the workpiece.

Lock ring 11 is maintained in temporary rigid engagement with body 10 by virtue of a dimple or inwardly laterally displaced area 11b situated in groove 11a. That is, by applying a lateral, external force inwardly in at least one position in groove 11a, the lock ring material at this particular area is inwardly deformed so as to provide a slight lateral distention of the internal serrations 21 situated opposite the point of application of the force. Serrations 21 are thereby laterally misaligned with respect to the interengaged external serrations 16 of the flange 15 so as to create a friction lock therebetween.

Upon the application of a sufficient axial force on lock ring 15 as aforesaid, the frictional engagement between the distended internal serrations 21 of the lock ring 11 and the engaged external serrations 16 of the flange 15 is overcome so that said lock ring 15 is disengaged from its temporary rigid engagement with the body 10 of the fastener. Guided by the interengagement of the longitudinally extending serrations carried by the flange 15 of the body 10, the lock ring 11 is displaced into locking engagement with the workpiece bore in a predetermined manner.

The fitting of the instant invention is installed by screwing it into a threaded bore 23 formed in workpiece material 24. The workpiece bore 23 is provided with threads 25 and a pair of concentric counterbores 26 and 27 longitudinally separated by an annular beveled surface 28. The body 10 of the fitting is screwed down until the tapered sealing face 17 provided by flange 15 is in tight surface-to-surface engagement with the annular beveled surface 28 of the workpiece bore 23 so as to provide a positive metal-to-metal seal. It will be noted that the annular shoulder 17a of the tapered sealing face 17 extends into the workpiece bore beyond the annular edge 28a of the cooperating annular beveled surface 28 when body 10 is fully threaded into the workpiece bore 23. The reason for this is extremely important. In prior fittings of this type, where the annular shoulder 17a was seated along the face of the annular beveled surface 17 when the body was fully threaded into the workpiece bore, the final cinching torque usually applied caused the shoulder 17a to score and gauge the face of the beveled surface 28. Thereafter, subsequent vibration would tend to cause the metal-to-metal seal to leak.

It should be further noted that the depth of serrations 16 carried by flange 15 are correlated with the angle of taper of tapered sealing face 17 so that said serrations do not intersect the sealing face at the portion thereof which forms the metal-to-metal seal in conjunction with the beveled surface 28 of the workpiece bore.

Before body 10 is threaded into the workpiece bore 23, an O-ring, if desired, may be placed aroung the reduced portion 18 of lower portion 19 of body 10, adjacent the lower surface of flange 15 as shown. It should be noted that although the addition of an O-ring may enhance the sealing capabilities of the fastener, the use of an O-ring is not essential to the invention herein.

The O-ring seal is a standard commercially available product having a resilient inner spring surrounded by a soft metallic or nonmetallic sealing material, so that when the ring is in place it may be compressed to fill the interstices and effect a seal between the element about which it is placed under tension and the element which externally constrains it.

FIG. 4 illustrates an alternate embodiment of the invention which is in all respects similar to the embodiment of FIG. 1 except that an annular groove 29 is provided in annular shoulder 17a of tapered sealing face 17 and extends longitudinally therein. There is thus formed a flexible edge portion 17b which flexes concentrically inwardly upon the installation of the body in a workpiece bore due to the interface contact of tapered sealing face 17 with bevelled surface 28 thereby providing even a more positive interface metal-to-metal seal. It should be noted that the depth of groove extends axially beyond the juncture of the lower edge of bevelled surface 28 of the workpiece bore and tapered sealing face 17 of flange 15. In FIG. 4 the fitting is shown fully installed with the lock ring 11 embedded in the workpiece. Also, as aforesaid, in either embodiment the O-ring is optional and may be omitted, and is omitted in FIG. 4.

Body 10, together with the lock ring 11 temporarily secured thereto, is threaded into bore 23 until tapered sealing face 17 is in tight association with annular bevelled surface 28 of said bore 23 thereby forming a metal-to-metal seal. After tapered sealing face 17 of body 10 is in tight association with the bevelled surface 28, an axial force is applied to the top of lock ring 11 thereby longitudinally displacing said ring downwardly so as to embed the external serrations 22 thereof into the workpiece 24. Lock ring 11, being in its fully locked position, is prevented from subsequent rotational movement and concomitantly preventing rotational displacement of body 10.

While one embodiment of the invention has been described, it is understood that the particular embodiment of the invention herein disclosed is for illustrative purposes only and that various changes may be made therein without departing from the principles of the invention or the scope of the annexed claims.

I claim:

1. An improved pressure fluid fitting for installation in a workpiece bore having a beveled sealing shoulder comprising:

a tubular body, said body having a first and second external annular groove in longitudinal spatial relationship, said body having external helical threads on at least a portion of said body;

an annular radial flange carried by said body, said flange being provided with a forward tapered end to form a truncated cone portion, the taper of said cone portion being sufficient to extend the forward end of said truncated cone portion axially beyond the accommodating beveled sealing shoulder provided by the workpiece bore, said flange being provided with longitudinally extending external serrations which form crests and roots, said serrations intercepting said cone portion of said flange at a point on said cone portion above the part thereof which engages the sealing shoulder provided by the workpiece bore;

an internally and externally serrated lock ring temporarily rigidly engaged to said flange, the internal serrations of said lock ring being engaged with the serrations of said flange, said external serrations being adapted to be embedded in the surface of the workpiece upon application of an axial force thereon thereby preventing rotational movement of said body relative to said workpiece;

an external annular groove carried by said lock ring for subsequent removal of said lock ring from engagement with said workpiece bore said groove intersecting the crests of the external serrations of said lock ring; and means carried by said lock ring for temporarily rigidly securing said lock ring to said body prior to the axial displacement of said lock ring into the workpiece, said means being a laterally distended portion of the internal serrations carried by the lock ring so as to misalign the same relative to the external serrations carried by the flange thereby creating a friction lock.

2. An improved pressure fluid fitting as described in claim 1, wherein the upper and lower edges of the flange are formed by the first and second external annular grooves carried by the tubular body and the body is provided with external helical threads on opposite sides of the flange.

3. An improved pressure fluid fitting as described in claim 1 wherein the laterally distended portion of the lock ring is formed by a depression in the annular groove carried by the lock ring and due to the application of an external pressure applied inwardly and laterally thereto so as to form an external localized dimple and an internal localized misalignment of the internal serrations of the lock ring.

4. An improved pressure fluid fitting as described in claim 1 wherein the forward tapered end of the truncated cone portion is formed to provide an annular shoulder and a flexible, longitudinally extending projection means adjacent said forward tapered end.

5. An improved pressure fluid fitting as described in claim 4 wherein the flexible projection means is formed by an annular groove axially projecting inwardly in said annular shoulder.

6. An improved pressure fluid fitting as described in claim 5 wherein the depth of said annular groove in the annular shoulder extends axially beyond the point of juncture of the beveled sealing shoulder provided by the workpiece bore and the truncated cone portion of the radial flange.

References Cited
UNITED STATES PATENTS

| | | | |
|---|---|---|---|
| 3,395,934 | 8/1968 | Rosan et al. | 285—92 X |
| 2,600,257 | 6/1952 | Neilon | 285—110 |
| 2,746,486 | 5/1956 | Gratzmuller | 285—110 X |
| 2,726,102 | 12/1955 | Webb | 285—110 X |
| 3,191,973 | 6/1965 | Guarnaschelli | 285—110 |
| 3,259,163 | 7/1966 | Rosan et al. | 285—92 X |
| 3,502,355 | 3/1970 | Demler et al. | 285—110 |

DENNIS L. TAYLOR, Primary Examiner

U.S. Cl. X.R.

285—39, 92